United States Patent [19]

Burquier

[11] 4,394,039
[45] Jul. 19, 1983

[54] MULTIPLE UNIONS FOR SIMULTANEOUSLY JOINING A PLURALITY OF PNEUMATIC OR HYDRAULIC PIPES

[75] Inventor: Jean-Luc Burquier, Veyrier du Lac, France

[73] Assignee: S.A. Des Etablissements Staubli, Faverges, France

[21] Appl. No.: 244,482

[22] Filed: Mar. 16, 1981

[30] Foreign Application Priority Data

Mar. 25, 1980 [FR] France .................................. 80 07625

[51] Int. Cl.³ .................... F16L 55/00; F16L 39/00; F16L 37/00
[52] U.S. Cl. ................................. 285/85; 285/137 R; 285/310; 285/317; 285/DIG. 13
[58] Field of Search .................... 285/137 R, DIG. 13, 285/84, 85, 91, 317, 320, 312, 310

[56] References Cited

U.S. PATENT DOCUMENTS 3,479,005 11/1969 DeGraff .......................... 285/85 X
3,527,480 9/1970 Larson ............................... 285/85

Primary Examiner—Richard J. Scanlan, Jr.
Attorney, Agent, or Firm—Dowell & Dowell

[57] ABSTRACT

The invention relates to multiple unions of the type comprising two plates which carry elementary unions and which are brought close together or spaced apart, by force, with the aid of at least one maneuvering device of the rack and pinion type. Initial latching of the two plates is ensured by a bolt-pillar mechanism, the pinions having on the shaft an angular clearance enabling them to remain immobile and to allow unlocking when the handle begins its movement for the separation of the two plates. With this handle are associated locking means which ensure retention thereof in locked position.

8 Claims, 9 Drawing Figures

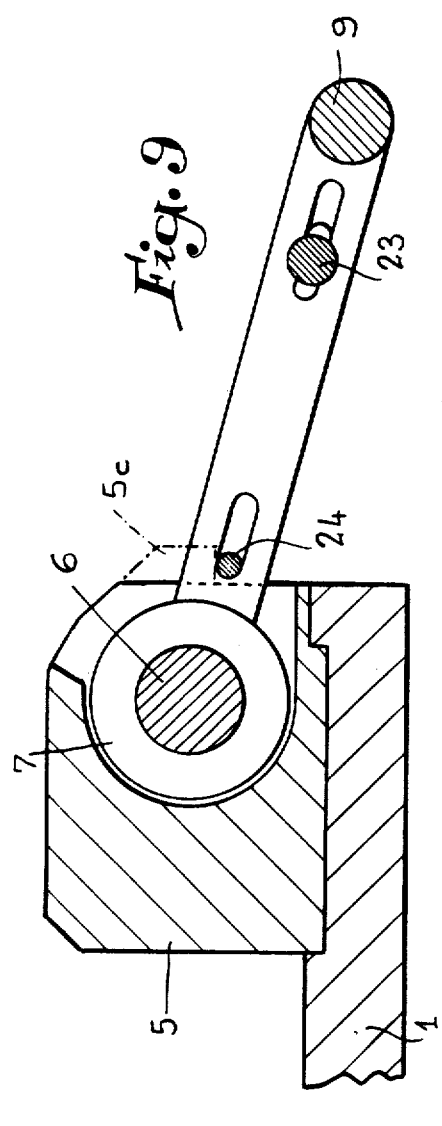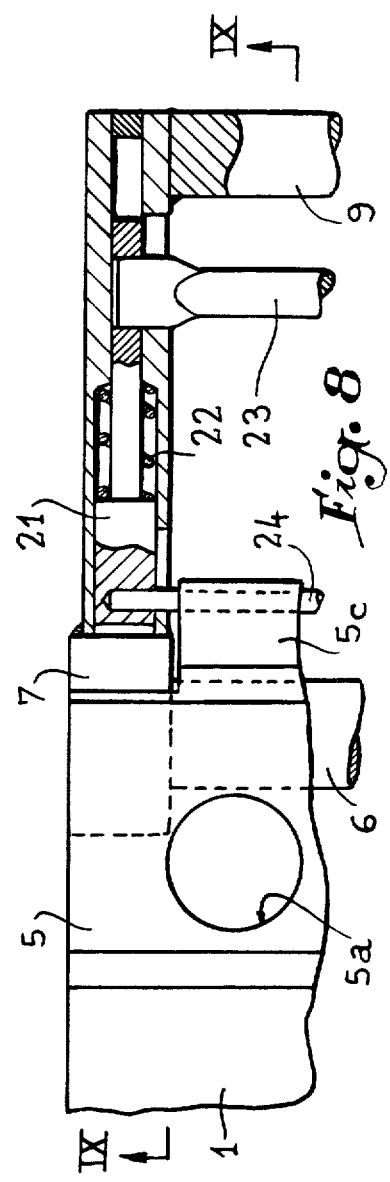

MULTIPLE UNIONS FOR SIMULTANEOUSLY JOINING A PLURALITY OF PNEUMATIC OR HYDRAULIC PIPES

The present invention relates to multiple unions used for simultaneously joining a plurality of pipes through which gases or liquids circulate.

It is known that devices of this type generally comprise two separate plates on each of which are fixed the elements, male for one, female for the other, of a number of elementary unions corresponding to the number of pipes to be simultaneously connected. These plates are equipped with at least one manoeuvring device comprising a cam or rack used to bring said plates closer together or further apart, by force, thus overcoming the resistance exerted by the seals and the return springs associated with the automatic valves of the different elementary unions.

The plates should, of course, be provided with locking means adapted to maintain them positively in assembled position. In known constructions, this locking is generally achieved by bolts carried by the elementary unions, these bolts being automatically controlled, for release, when the two plates are separated under the effect of the manoeuvring device. It will be readily appreciated that such an arrangement renders the multiple union heavy and also increases the price thereof.

It is a particular object of the improvements according to the invention to remedy the above-mentioned drawback and to enable a multiple union to be produced which responds particularly well to the various requirements of the art.

It is a further object of the invention to provide the handle or like member for actuating the manoeuvring device with a retaining mechanism effectively opposing any untimely unlocking action.

The invention will be more readily understood on reading the following description with reference to the accompanying drawings, in which.

Figure 3:
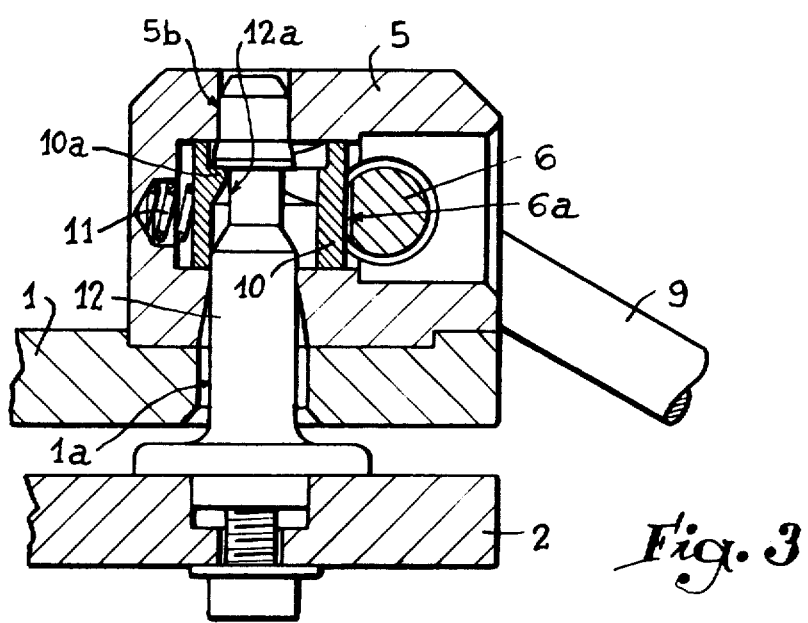
Figure 4:
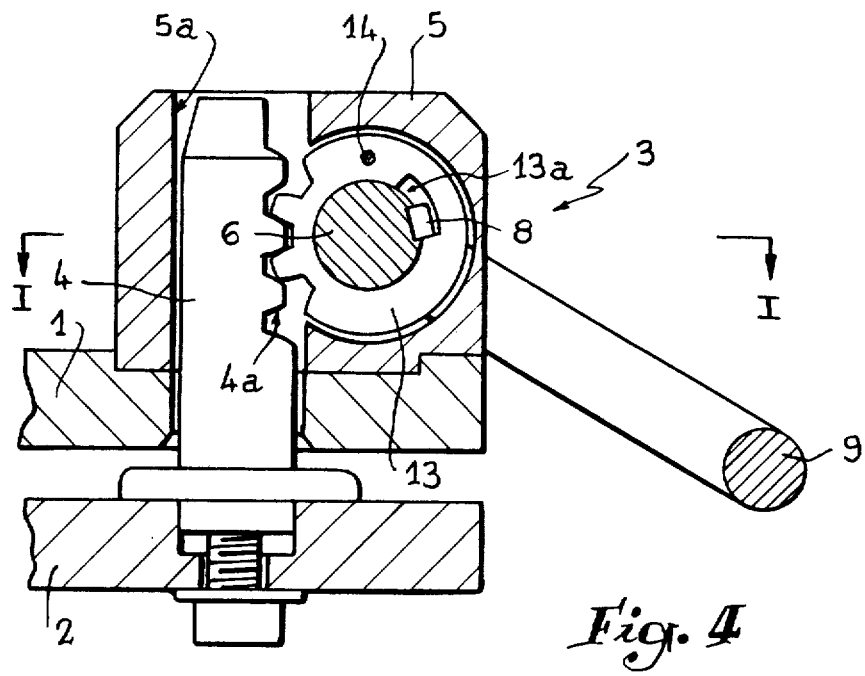
Figure 5:
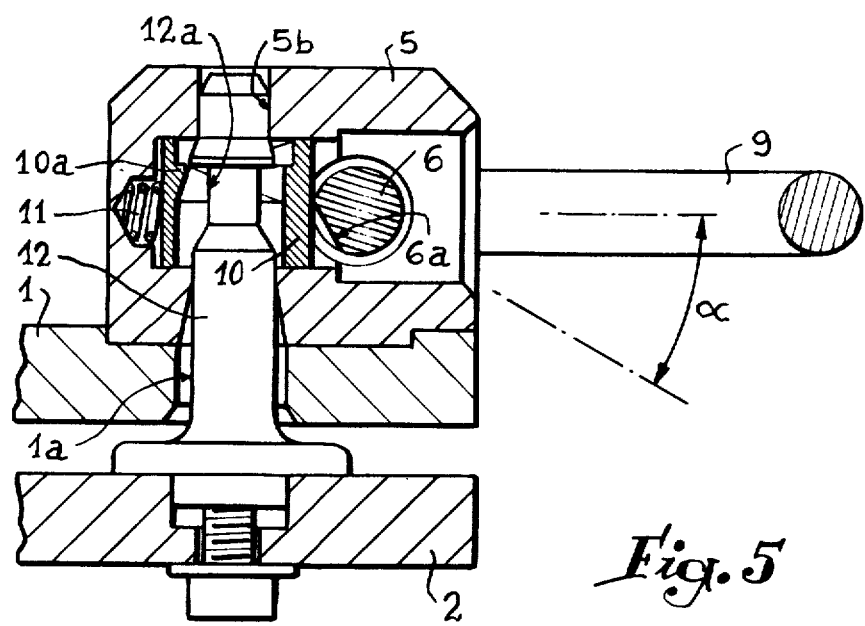
Figure 6:
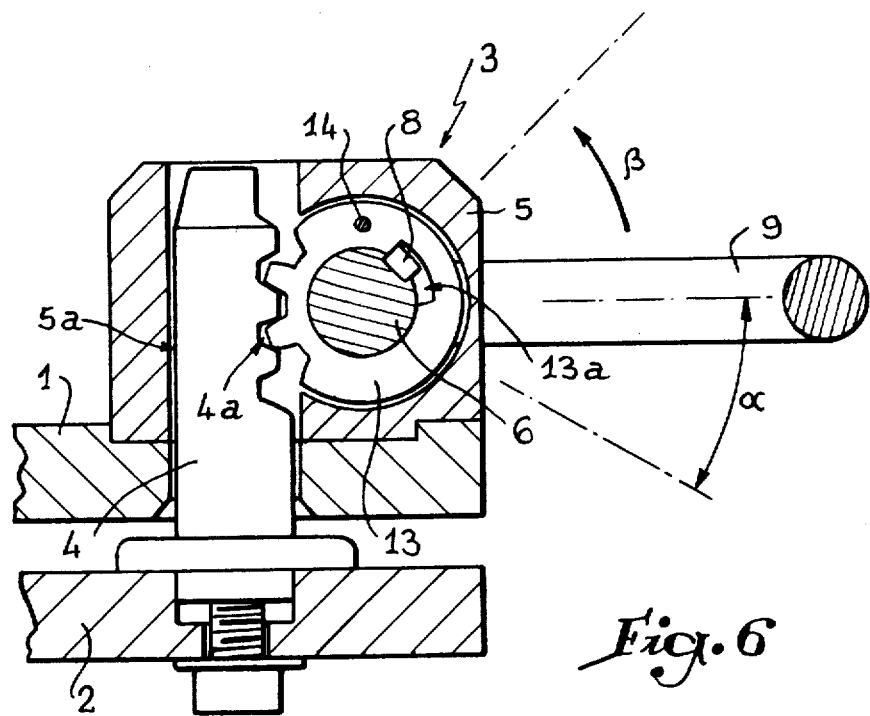

FIGS. 5 and 6 reproduce FIGS. 3 and 4 respectively, in another position.

Figure 7:
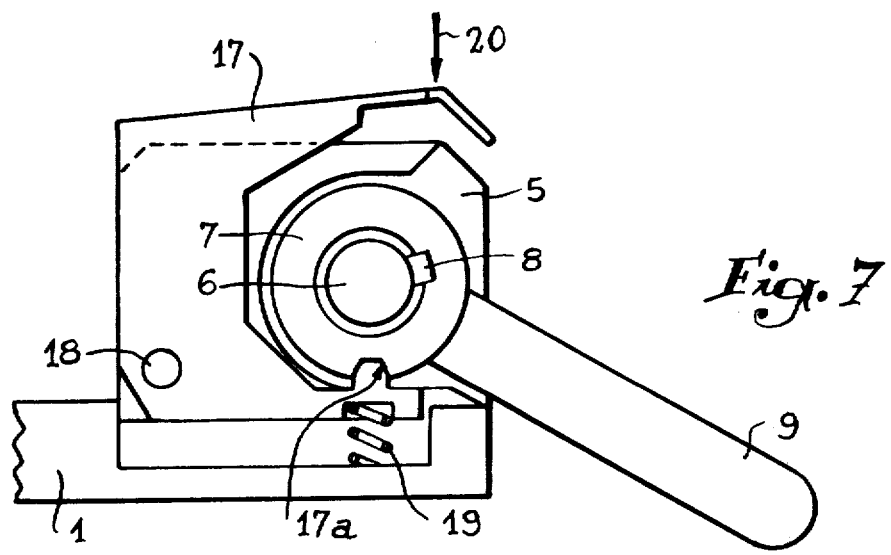

FIG. 7 is a side view illustrating a modified embodiment of the retaining mechanism associated with the handle for actuating one of the two manoeuvring devices of the multiple union according to the invention.

FIG. 8 is a plan view with parts broken away, illustrating another modification of the retaining mechanism.

FIG. 9 is a section along the plane indicated at IX—IX in FIG. 8.

Figure 1:
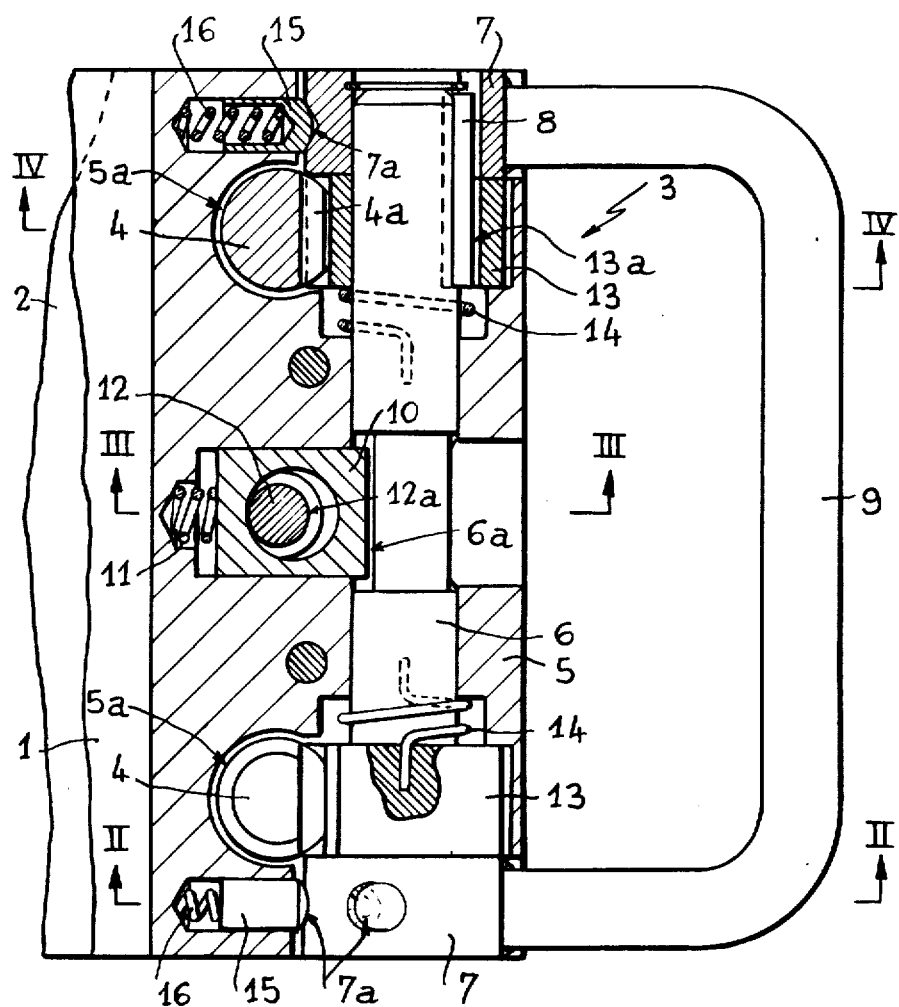
FIG. 1 is a horizontal section of one of the two ends of a a multiple union according to the invention.

In the following description, it has been assumed that the invention is applied to multiple unions of the type in which the independent plates 1 and 2 which carry the two series of male and female elements of the elementary unions are assembled and separated with the aid of two identical manoeuvring devices provided along the opposite transverse edges of the said plates. In FIG. 1, only one of these two devices has been illustrated, namely the device generally referenced 3.

This manoeuvring device 3 comprises two columns 4 the base of each of which is fixed to the lower second plate 2. The side of each column facing the corresponding transverse edge of said plate is cut out to form a rack 4a opening at the top of the column in question. Each of the transverse edges of the upper first plate 1 is provided with a small block 5 facing upwardly and pierced vertically to provide a bore 5a for receiving one of the two corresponding columns 4.

Figure 2:
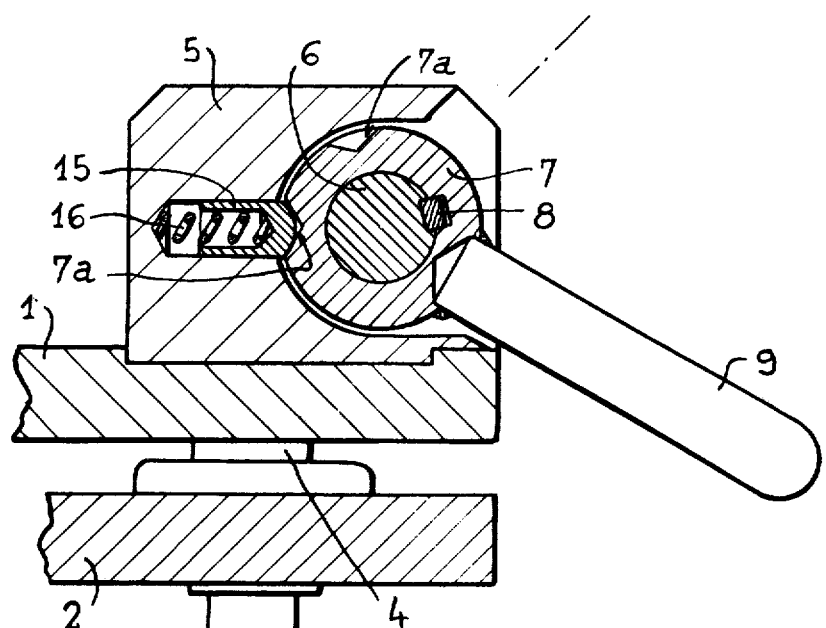
FIGS. 2 to 4 are sections along planes respectively indicated at II—II, III—III and IV—IV (FIG. 1); in the section of FIG. 4, the plane of section of FIG. 1 is shown at I—I.

Each manoeuvring device 3 also comprises a control shaft 6 mounted longitudinally in the block 5. As shown in FIGS. 1 and 2, this shaft 6 is made fast, at each of its ends, with a ring 7 fixed on the end in question with the aid of a shaft key 8. The two rings 7 are connected to each other by a loop-shaped handle 9 so that the angular shifting of each handle 9 of the multiple union causes rotation of shaft 6.

At its centre, the shaft 6 has a portion of reduced diameter which is further cut away to determine a flat portion 6a (FIGS. 1, 3 and 5). This flat portion 6a is adapted to contact a bolt 10 of cylindrical form and vertical axis, mounted for horizontal reciprocation in a cavity in the block 5 envisaged. This bolt 10 is urged by a lateral spring 11 which functions elastically to latch a tooth 10a in an annular depression 12a made in a pillar 12. The latter is carried by the central part of the plate 2 and it will be understood that, when the two pillars 12 of the plate 2 engage in the perforations 1a of the plate 1 and 5b of the two blocks 5, the end of each of the said pillars displaces the corresponding bolt 10 which, under the effect of the spring 11, elastically latches its tooth 10a in the depression 12a. Latching of the two plates is thus rendered automatic.

Furthermore, if each shaft 6 is then rotated angularly by raising the corresponding handle 9, the flat portion 6a, which was, until then, applied flat against the outer wall of the bolt 10 in question, displaces the latter against the spring 11. The tooth 10a is thus disengaged from the depression 12a and consequently allows the withdrawal of the pillar 12 and the separation of the two plates 1 and 2.

Finally, each manoeuvring device 3 comprises two toothed pinions 13 (FIGS. 1, 4 and 6) adapted to cooperate with the rack 4a of the columns 4. Each of these pinions 13 is fixed to the shaft 6 by the key 8 which ensures wedging of the adjacent ring 7, it being noted that the part of this key 8 which corresponds to the central opening of the pinion 13 is engaged in an arcuate slot 13a in said opening. Under these conditions, it will be appreciated that, due to the angular clearance which the key 8 has with respect to its pinion 13, the latter is not immediately displaced angularly when the shaft 6 begins to rotate under the effect of rotation of the handle 9.

It should be noted that, with each pinion 13 is associated a spring 14 subjected to torsion (FIGS. 1 and 4). One end of the spring 14 is fixed to the block 5 whilst the opposite end is fixed to the pinion in question. The latter is therefore elastically returned and retained in a given angular position with respect to the shaft 6. This angular position is arranged to be the one illustrated in FIG. 4, for which the pinion is rotated counterclockwise so that the key 8 receives the support of the lateral wall of the slot 13a which faces downwardly.

Consequently, with the handle 9 horizontal when the user brings together the two plates 1 and 2 with a view to connection of the pipes connected to the elementary unions, the rotation of the pinions 13 which cooperate with the rack 4a of the columns 4 occurs through a lost motion angle corresponding to the angular amplitude of the arcuate slot 13a, without moving the handles 9; this angle corresponds to the bringing together of the two plates 1 and 2 by hand. The lowering by force of the handles 9 then ensures tightening of the said plates and locking thereof. The position is then as illustrated in FIGS. 2, 3 and 4.

In order to separate the plates of the multiple union, the operator raises each handle 9 angularly. During the lost motion part of this stroke (angle α of FIGS. 5 and 6), the pinions or cams 13 remains immobile due to the clearance of the key 8 in the arcuate slot 13a, whilst the rotation of the shaft 6 effects leftward displacement of the bolt 10 so that the two plates 1 and 2 are no longer locked. On the contrary, during angle β (FIG. 6) of the stroke, the keys 8 drive the pinions 13 with the shaft 6, so that the two plates are forced apart with respect to each other.

However, the risk of one or the other of the two handles 9 of the multiple union being inopportunely unlocked, from the locked position of FIGS. 2, 3 and 4, must be considered. With a view to avoiding such an eventuality, the invention provides each manoeuvring device 3 with a retaining detent mechanism.

In FIGS. 1 and 2, this detent mechanism is constituted by a finger 15 associated with each of the rings 7. A spring 16 tends to push this finger 15 elastically so that its end engages in one or the other of the two depressions 7a made in the periphery of the corresponding ring 7.

When such an elastic detent is not considered sufficient, the embodiment illustrated in FIG. 7 may be employed. The retaining member is here constituted by a stirrup-shaped member 17 which covers the top of each block 5 having bent lateral arms which are pivoted at 18 on said frame. Two lower springs 19 tend to maintan the stirrup 17 in high position for which a vertical boss 17a of each arm engages in a corresponding notch in each of the rings 7.

These rings 7 are thus retained positively against any rotation. A vertical pressure (arrow 20) on the stirrup 17 during manoeuvre of the corresponding handle 9 makes it possible to release these rings and the shaft 6 to separate the two plates 1 and 2.

As a modification, the arrangement of FIGS. 8 and 9 may also be employed. Each of the lateral arms of each handle 9 is hollow and contains a push element 21 associated with a compression spring 22. The two push elements 21 are connected transversely to each other by two rods 23 and 24 which pass through elongated slots in the said arms to extend parallel to the central part of the handle 9. The springs 22 tend elastically to maintain the rod 24 below a nose 5c of the frame 5, preventing the rise of the handle 9, so that the user must actuate the rod 23 for displacement thereof from below the nose 5c when he desires to manoeuvre said handle.

The preceding description has, of course, been given solely by way of example and in no way limits the field of the invention. Equivalent modifications may be made thereto without departing from the scope of the invention.

What is claimed is:

1. In a multiple union device for simultaneously joining the complementary male and female elements of a plurality of elementary unions equipped with seals, said union device comprising:
   (a) first and second plates for supporting the male and female elements and operative to be brought close together so as to compress the seals associated with the elements carried by said plates, said second plate having fixed thereto paired toothed columns which project from its surface toward the first plate, and said first plate supporting opposite each pair of columns a block having bores disposed to slidably receive said columns;
   (b) automatic latching means to retain said plates in an operative position in which the seals would be compressed between the male and female elements of the elementary unions, said latching means comprising pillar means fixed to said second plate and projecting toward the first plate, each pillar means being formed with a transverse depression, said first plate and block having a perforation disposed to slidably receive said pillar means, and bolt means slidably carried by said block and having a tooth operative to engage said transverse depression of said pillar means to retain said plates in said operative position, the bolt means being displaceable to disengage the tooth from said depression to permit separation of said plates;
   (c) a shaft rotatably supported by each block and passing adjacent to each bore, a pair of pinions mounted on each shaft and respectively extending into each bore and disposed therein to mesh with one of said toothed columns, the pinions being operative when rotated in a first locking direction to displace said first plate toward said second plate and being operative when rotated in a second unlocking direction to urge said first plate away from said second plate;
   (d) release means carried by said shaft and operative to displace said bolt means to disengage said tooth from said depression when said shaft is rotated in said second unlocking direction; and
   (e) lost-motion connecting means coupling said shaft and said pinions, said connecting means allowing said pinions a predetermined angle of freedom of rotation with respect to said shaft.

2. In a multiple union device as claimed in claim 1, resilient means operative to urge said bolt means toward said pillar means to engage said tooth in the depression.

3. In a multiple union device as claimed in claim 1, said release means comprising a flat portion so located on the shaft as to normally pass said bolt means but operative to displace the bolt means to disengage the tooth from said depression when said shaft is rotated in said second unlocking direction.

4. In a muliple union device as claimed in claim 1, resilient means interposed between said shaft and each of said pinions, and said resilient means being operative to yieldably permit said pinions to rotate on said shaft in a direction to receive said toothed columns into the bores of the block.

5. In a multiple union device as claimed in claim 4, said lost-motion connecting means comprising on each of said pinions an inner arcuate slot facing the shaft, and a key carried by the shaft under each pinion and extending into its arcuate slot, the angular extent of the slot being greater than the width of the key.

6. In a multiple union device as claimed in claim 1, an actuating handle for said shaft, ring means carried by the handle and fixed on the shaft, said ring means having peripheral notches thereon, and resilient means carried by the block and cooperating with said notches to selectively retain said handle and said shaft in a first latched position in which the tooth of said bolt means is engaged with a pillar means and in a second position in which said tooth is disengaged from said depression.

7. In a multiple union device as claimed in claim 6, positive locking means to lock said handle in said first position thereof.

8. In a multiple union device as claimed in claim 7, said actuating handle including spaced hollow arms radially extending from said shaft and connected to each other by an intermediate arm portion spaced from said shaft, said positive locking means comprising two pusher members each slidably disposed within one of said hollow arms, resilient means urging each of said pusher members toward the shaft, first and second spaced rods disposed parallel to said shaft and having their respective opposite ends connected in different pusher members, said arms being slotted for passage of the rods to permit displacement thereof along the arms, and a nose projecting from said block into the path of the rod located nearest to the shaft and located to form an abutment contacting the rod in said first locked position to prevent movement thereof in said second unlocking direction.

* * * * *